Jan. 24, 1967          D. C. OLSON                3,300,233
                         TOWBAR
Filed Feb. 19, 1965                           2 Sheets-Sheet 1
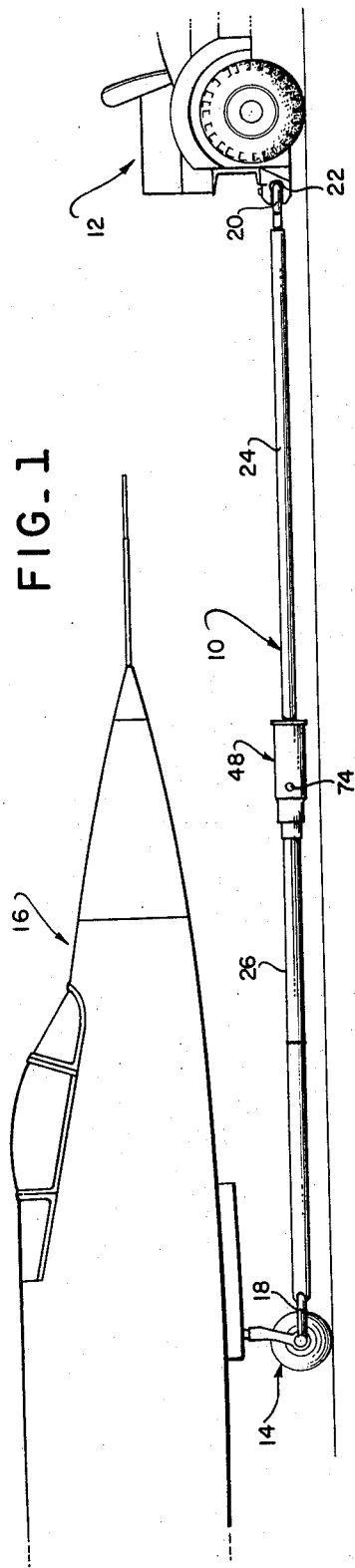
FIG_1
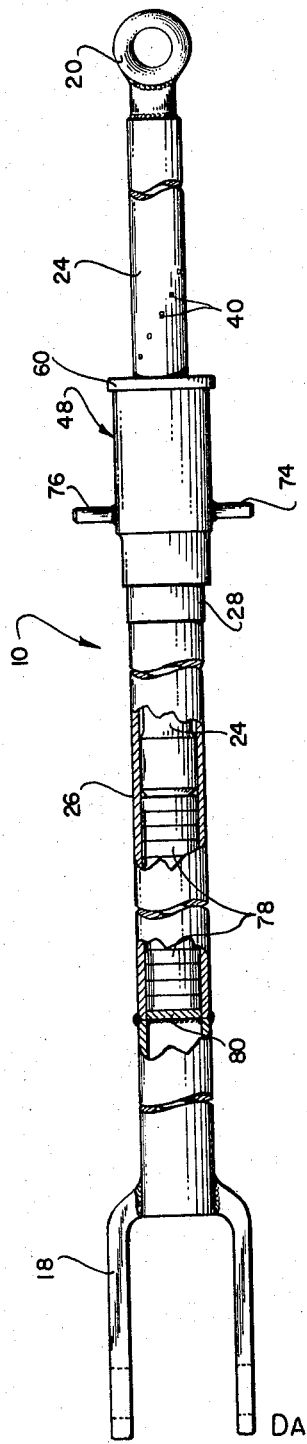
FIG_2
INVENTOR.
DAVID C. OLSON
BY
George C. Sullivan
   Agent Jan. 24, 1967  D. C. OLSON  3,300,233
TOWBAR
Filed Feb. 19, 1965  2 Sheets-Sheet 2
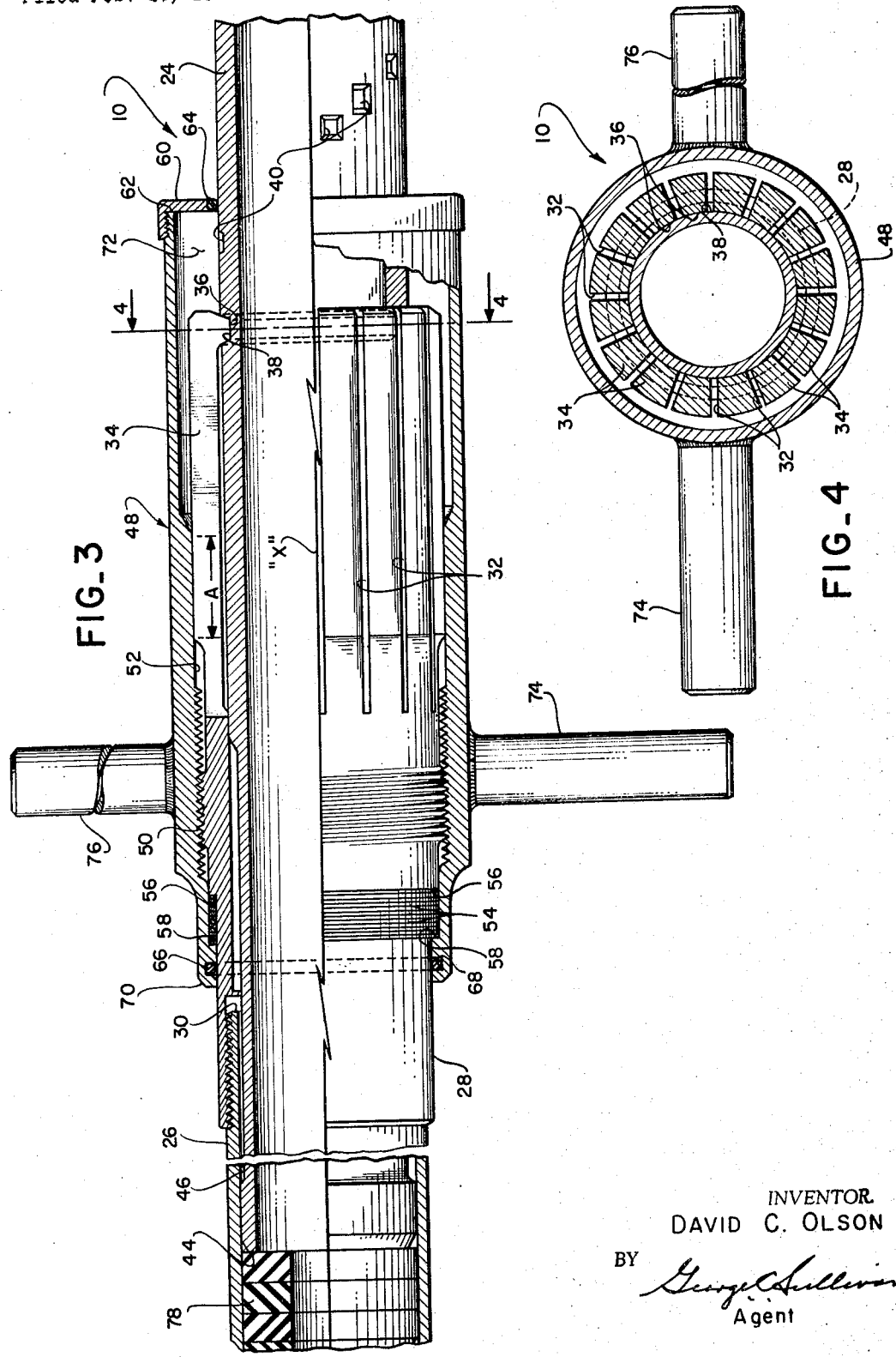
INVENTOR.
DAVID C. OLSON
BY
George C. Sullivan
Agent

United States Patent Office 3,300,233
Patented Jan. 24, 1967

---

3,300,233
TOWBAR
David C. Olson, Burbank, Calif., assignor to Lockheed Aircraft Corporation, Burbank, Calif.
Filed Feb. 19, 1965, Ser. No. 433,945
12 Claims. (Cl. 280—453)

This invention relates to a towbar for a vehicle and particularly to a resettable towbar which separates when an excessive load is exerted upon it.

A conventional towbar is used to pull or draw an immobile vehicle by a towing vehicle or truck. When using a towbar to drag a vehicle such as an aircraft, it is commonly attached to a landing gear. There is naturally a critical amount of force which may be placed upon a landing gear without damaging it in such a manner that its operation may be hampered.

Heretofore, it was conventional to construct a towbar in two parts which are linked together by a shear pin. By knowing the force required to shear the pin, it would then be axiomatic that only a specified amount of force could be applied to an aircraft landing gear before the shear pin would fail from the application of force. This type of towbar construction appears to be foolproof, however, there are some practical limitations to its use in service. First and foremost, a failue of a shear pin most generally occurs when towing an aircraft and an immobile aircraft could be a hazard to other aircraft, either mobile or immoble. With a shear pin failure, it is then required that another towbar be obtained or that the shear pin be replaced at the site of the failure. Frequently, substitute towbars are not available, leaving the only alternative left to replace the shear pin. The removal of failed shear pins and subsequent installation of other new shear pins have been found to be difficult and time-consuming tasks which ordinarily should be performed by skilled personnel. Removal of a shear pin requires proper tools and its replacement is not easily performed in the field. Due to the lack of supervision, it is not uncommon that a shear pin is replaced by an ordinary bolt which will serve its purpose by linking the two parts of a towbar together, however, it does not protect the aircraft landing gear from being subjected to abnormally high loads on the landing gear and can cause damage.

The prior art towbars using shear pins have also been troubled with problems by a partial failure of shear pins which cause ultimate failures at forces applied to the towbars which are less than those which can be safely loaded upon aircraft landing gears. Further, the bores through which the shear pins extend have elongated through prolonged use and tend to shorten the life of the towbar and make replacement of shear pins difficult if not impossible.

In accordance with the present invention, many of the disadvantages of the prior towbars have been eliminated. A towbar in accordance with the present invention is formed in such a manner that it will release after a specified amount of load is subjected upon it in order to protect the vehicle being towed. The advantage of using the present invention is that the towbar is resettable without a major change of parts and further the resetting operation can be conducted by hand without the need for tools and skilled personnel to perform this resetting operation. The towbar is formed from two telescoping shafts that are interconnected by a flexible finger on one shaft that extends into an opening of a second shaft. Only by applying a sufficient force will this finger be forced out of the opening and thereby permit the towbar to part. An important feature of the invention is directed to a collar which is threaded on one shaft and mates with the flexible finger, and by rotation of this collar the amount of finger which can flex is variable and thereby affords a change in the amount of force required to cause the towbar to part under load. The collar permits the towbar to be reset after it has been severed by a load; by removing the collar from the finger, it may be reinserted in the opening and the collar replaced over the finger to complete the resetting operation.

In its broadest aspect, a towbar constructed in accordance with the present invention includes a first and second shaft telescoping one within the other. The first shaft includes an opening and the second shaft has a flexible finger extending toward the second shaft opening. A portion of the second shaft flexible finger extends within the opening and engages the first shaft to prevent telescoping movement between the shafts. The two shafts do not ordinarily telescope relative to each other unless a force is exerted upon the shafts which is great enough to flex the finger out of the first shaft opening and thus permit the shaft to telescope.

Other features and advantages of the present invention will become more apparent upon review of the attached description and the accompanying drawings in which:

FIGURE 1 is a side elevation of a towbar constructed inaccordance with the present invention and being used to tow an aircraft by a towing tractor;

FIGURE 2 is a side elevation of a towbar in accordance with the present invention and partly broken away to show a cushioning device;

FIGURE 3 is a partial longitudinal cross-sectional view of a portion of the towbar illustrated in FIGURES 1 and 2; and FIGURE 4 is a cross-sectional view taken along line 4—4 of FIGURE 3.

Referring now to FIGURE 1, a towbar 10 constructed in accordance with the present invention is used to couple a towing vehicle 12 to a landing gear 14 of an immobile aircraft 16. It should be appreciated that the force or stress applied by the towing vehicle is all concentrated upon the landing gear 14 and therefore the amount of force must be limited or the landing gear will be damaged or bent possibly to a point which can be detrimental to further operation of the aircraft. The towbar 10 has a bifurcated clevis 18 which engages the landing gear 14 and at the opposite end of the towbar is a torus shaped ring 20 which engages a lug 22 on the vehicle 12. The ring 20 and the clevis 18 are conventional structure and do not form a part of the present invention.

Referring now to all the figures, and especially to FIGURES 3 and 4, the towbar 10 includes a hollow tubular shaft 24 which extends within a second hollow tubular shaft 26 such that the two shafts can telescope one within the other and allow relative movement to occur in the towbar.

A tubular detent 28 is threaded upon an end 30 of the shaft 26 and encircles the other shaft 24. The detent 28 has a series of slots 32 all cut radially from longitudinal axis X, and thus the slots form a plurality of identically shaped flexible teeth 34 which extend around the periphery of the detent. The detent 28 is also formed with an opening large enough to admit the shaft 24 and permit the shafts 24 and 26 to telescope within each other. Each of the flexible fingers 34 is formed with a tapered tooth 36 which is best seen in FIGURE 3 and is directed toward the longitudinal axis X of the towbar.

For purposes of engaging the shaft 26 to the second shaft 24, an annular groove 38 is formed in the shaft 24 and has tapered sidewalls mating with the tapered tooth 36 on the flexible fingers of the detent 28. With the detent teeth 34 engaged in the annular groove 38, the shafts 24 and 26 are linked together into an integral unit. The teeth 36 are inserted within the groove 38 by forcing the shaft 24 through the tubular detent 28 by flexing the fingers 34 to permit the admittance of the shaft 24. As the tapered tooth 36 engages the annular groove 38, the fingers flex toward the longitudinal axis X of the towbar such that the fingers are in a non-stressed condition. A series of staggered cavities 40 are disposed on the outer surface of the shaft 24 and in alignment with the flexible fingers 34. In the event the fingers are flexed out of the annular groove 38 by a force on either the shaft 24 or 26, the movement of the teeth 36 over the cavities 40 will generate a noise sufficient to give notice to a party using the towbar to tow a vehicle and would then be alerted to reset the towbar.

For purposes of guiding the shaft 24 within the second shaft 26, a tip 42 on one end 44 of the shaft 24 is of such a size as to mate with the interior of shaft 26. This aids in the telescoping movement of the two shafts together. A portion of the hollow shaft 24 has an undercut portion 46 adjacent to the tip 42 for purposes of preventing undue friction while the two shafts 24 and 26 telescope. The remainder of the shaft 24 is of the same or substantially the same size as the interior of the shaft 24 and the detent 28 to thus guide the two shafts together.

A hollow tubular collar 48 is threaded upon the detent 28 by series of threads 50. An interior cylindrical surface 52 formed on the collar 48 mates with the exterior of the flexible fingers 34. The purpose of the cylindrical surface 52 is to prevent a limited portion of the fingers 34 from flexing relative to the shaft 24. As shown on FIGURE 3, the distance indicated as A on the flexible fingers 34 is rigidly supported by the cylindrical surface 52 on the collar and leaving only the unsupported portions of the fingers able to flex. A plurality of ring-like spacers 54 act as an adjustable stop for the collar 48 as it is being threaded on the detent 28. The spacers 54 are disposed over the detent 28 and abut a flange 56 formed on the detent and are held in position by a second flange 58 disposed on the interior of the collar 48. By removal of one or more of the spacers 54, the distance that the cylindrical surface 52 engages the flexible fingers 34 is lengthened, or conversely, by adding more spacers the distance would be shortened. This change in support of the collar will in essence change the amount of pressure required to be exerted upon the towbar before the flexible finger will be forced from the annular groove 38.

An end cap 60 is threaded upon an end 62 of the collar 48 and includes an O-ring seal 64 that engages the shaft 24. A second O-ring seal 66 is disposed within an annular groove 68 formed in an end 70 of the collar 48. The O-ring seals 64 and 66 cooperate to prevent any leakage of a grease 72 which is applied to the interior of the collar 48 to prevent corrosion of the shafts 24 and 26 and prevent any freezing or contamination by moisture or dirt of the teeth 36 in the annular groove 38. With this construction, the towbar 10 may be stored in extremes of both temperatures and atmospheres without a deterioration of the apparatus within the collar 48 which links the shafts 24 and 26 together into an integral unit.

For purposes of rotating the collar 48 relative to the detent 28, a pair of handles 74 and 76 are welded on opposite sides of the collar and permit rotation of the collar either on or off the detent during the resetting operation.

Referring now to FIGURE 2, for purposes of providing a shock absorber in the towbar, a plurality of resilient discs 78 are disposed within the shaft 26 and fill the space between an end of the shaft 24 which telescopes within the shaft 26. To prevent movement within the towbar 10, a metal partition 80 is welded to the interior of the shaft 26 and acts as a stop for the movement of the rubber discs 78. Thus, in the event the fingers 34 are flexed from the groove 38 by a force sufficient to cause this movement, the telescoping of the shaft 24 within the second shaft 26 will be cushioned by the compression of the resilient discs 78.

In operation, the towbar is assembled with the collar 48 rotated over the flexible fingers 34 into such a position that a known amount of force must be placed upon the shafts 24 and 26 before the towbar would telescope. This amount of force is dependent upon the amount of force which may be placed upon the landing gear of an aircraft as illustrated in FIGURE 1 without causing detrimental effects to the landing gear. The particular amount of force which can be subjected to the towed vehicle is dependent upon the strength of the vehicle being towed and is not considered a part of the present invention. At any rate, by moving the collar in a particular position on the flexible teeth 34, a particular amount of force required to flex the teeth from the annular groove is then known. As an example, when a force higher than that required to flex the teeth of the groove is subjected to the towbar, the fingers will in fact flex from the groove and cause the telescoping of the shafts 24 and 26 to occur. The movement of the tapered teeth 36 over the cavities 40 will generate a noise which will alert the driver of the vehicle 12 to protect himself and attempt to gain control of the towed vehicle. During the telescoping, the resilient discs 78 will be compressed when the shaft 24 and 26 are telescoped toward each other.

After the towing vehicle and the towed vehicle are rolled to a stop, the towbar may be reassembled by unscrewing the collar 48 off the detent 28 until it is stopped by the end cap 60 contacting the fingers. This releases the restriction on the fingers. By sliding the fingers 34 over the shaft 24 until the teeth 36 engage the annular groove 38, the towbar is again engaged and ready for further use. The collar 48 is rethreaded over the detent until the flange 58 engages the spacers 54.

An important feature of the present invention is a towbar which may be reassembled by hand without the need for additional assemly equipment or tools or any nature. Reassembly operation may be performed by non-skilled personnel who may be called upon to use the towbar in the field.

The present invention may be changed in its configuration to suit the particular installation upon which it is to be used. For example, the number of fingers disposed on one of the shafts is not necessarily required that they encircle the entire second shaft since ideally only one finger need be used to engage an opening in the second shaft to engage the two shafts together. Also, the position of the flexible finger can be changed with its relation with the telescoping shaft and need not be parallel to the longitudinal axis of the towbar.

I claim:
1. A towbar for a vehicle comprising:
a first and second shaft telescoping one within another for relative bidirectional movement,
the first shaft including an opening,
the second shaft including a bidirectionally disengageable flexible finger extending toward the second shaft opening,
a portion of the second shaft flexible finger extending within the first shaft opening and engaging the first shaft to prevent telescoping movement between the shafts;
whereby the two shafts do not telescope relative to each other unless a force is exerted on the shafts great enough to flex the finger out of the first shaft opening and thus permit the shafts to telescope in either direction.
2. A towbar for a vehicle comprising:
a first and second shaft telescoping one within another for relative bidirectional movement,
the first shaft including an opening, the second shaft including a means for resiliently bidirectionally engaging the first shaft and extending within the second shaft opening to permit telescoping movement between the shafts;

whereby the two shafts do not telescope relative to each other unless a force is exerted on the shafts great enough to flex the engaging means out of the first shaft opening and thus permit the shafts to telescope in either direction.

3. A towbar for a vehicle comprising:
a first and second shaft telescoping one within another for relative bidirectional movement,
the first shaft including an opening,
the second shaft including a bidirectionally disengageable flexible finger extending toward the second shaft opening,
the second shaft flexible finger including a tooth extending within the first shaft opening and mating the opening to prevent telescoping movement between the shafts;
whereby the two shafts do not telescope relative to each other unless a force is exerted on the shafts great enough to flex the finger out of the shaft opening and thus permit the shafts to telescope in either direction.

4. A towbar for a vehicle comprising:
a first and second cylindrical shaft telescoping one within another for relative bidirectional movement,
the first shaft including an annular groove having tapered walls,
the second shaft including a bidirectional disengageable flexible finger extending parallel to the length of the shafts and toward the second shaft groove,
the second shaft flexible finger having a tapered tooth mating and extending within the first shaft groove to engage the first shaft to the second shaft and prevent telescoping movement between the shafts;
whereby the two shafts do not telescope relative to each other unless a force is exerted great enough to flex the finger out of the shaft groove and thus permit the shafts to telescope in either direction.

5. A towbar for a vehicle comprising:
a first and second shaft telescoping one within another for relative bidirectional movement,
the first shaft including an opening,
a tooth extending within the first shaft opening,
a means for resiliently urging the tooth within the first shaft opening and being coupled to the second shaft and thereby bidirectionally engaging the first and second shafts together to prevent telescoping movement between the shafts;
whereby the two shafts do not telescope relative to each other unless a force is exerted on the shafts great enough to flex the tooth out of the shaft opening and thus permit the shafts to telescope in either direction.

6. A towbar for a vehicle as defined in claim 5 and in addition:
a means engaging the urging means for varying the force applied to the tooth by the urging means.

7. A towbar for a vehicle comprising:
a first hollow shaft formed with a series of flexible fingers extending around the shaft at one end,
a second shaft extending within the first shaft and including an annular groove,
the first shaft flexible fingers each including a tapered tooth extending within the second shaft groove such that the first shaft is bidirectionally linked to the second shaft,
a collar threaded on and rotatable relative to the first shaft and including a surface which mates with the flexible fingers and rotation of the collar on the first shaft changes the amount of the fingers which is flexible;

whereby the two shafts move as a unit until a predetermined force on the shafts forces the tapered teeth on the flexible fingers out of the annular groove and thereby permits the shafts to telescope relative to each other.

8. A towbar for a vehicle comprising:
a first hollow shaft formed with a series of flexible fingers extending around the shaft at one end,
a second shaft extending within the first shaft and including an annular groove,
the first shaft fingers each including a tooth extending within the second shaft groove such that the first shaft is linked to the second shaft,
a collar threaded on and rotatable relative to the first shaft and including a surface which mates with flexible fingers and rotation of the collar on the first shaft changes the portion of the fingers which are flexible,
a series of spacers disposed between the collar and the first shaft and serving as a stop for the rotatable collar and by removing some of the spacers, the collar may be rotated to a new position when disposed against the spacers;
whereby the two shafts move as a unit until a predetermined force against the shafts forces the teeth on the flexible fingers out of the annular groove and thereby permits the shafts to telescope relative to each other.

9. A towbar for a vehicle comprising:
a first and second shaft telescoping one within another,
the first shaft including an opening,
the second shaft including a flexible finger extending toward the second shaft opening,
a portion of the second shaft flexible finger extending within the first shaft opening and engaging the first shaft to prevent telescoping movement between shafts,
the second shaft including a cavity aligned with the opening such that the movement of the flexible fingers out of the opening will flex into the cavity and generate a noise to indicate that the shafts are telescoping;
whereby the two shafts do not telescope relative to each other unless a force is exerted on the shafts great enough to flex the finger out of the first shaft opening and thus permit the shafts to telescope.

10. A towbar for vehicle comprising:
a first and second shaft telescoping one within another for relative bidirectional movement,
the first shaft including an opening,
the second shaft including a bidirectionally disengageable flexible finger extending toward the second shaft opening,
a portion of the second shaft flexible finger extending within the first shaft opening and engaging the first shaft to prevent telescoping movement between the shafts,
a means within one of the shafts for cushioning the shafts in the event the shafts telescope toward each other;
whereby the two shafts do not telescope relative to each other unless a force is exerted on the shafts great enough to flex the finger out of the first shaft opening and thus permit the shafts to telescope in either direction.

11. A towbar for a vehicle comprising:
a first and second shaft telescoping one within another,
the first shaft including an opening,
the second shaft including a flexible finger extending toward the second shaft opening,
a portion of the second shaft flexible finger extending within the first shaft opening and engaging the first shaft to prevent telescoping movement between the shafts,
the first shaft including a series of cavities disposed on opposite sides of the first shaft opening and aligned with the second shaft flexible finger such that the flexible finger will generate a noise when entering the cavities as the shafts telescope, and a plurality of resilient discs disposed in one of the shafts to cushion one of the shafts in the event the shafts telescope toward each other;

whereby the two shafts do not telescope relative to each other unless a force is exerted on the shafts great enough to flex the finger out of the first shaft opening and thus permit the shafts to telescope.

12. A towbar for a vehicle comprising:

a first hollow shaft formed with a series of flexible fingers extending around the shaft at one end, a second shaft extending within the first shaft and including an annular groove, the first shaft flexed fingers each including a tooth extending within the second shaft groove such that the first shaft is linked to the second shaft, a collar threaded on and rotatable relative to the first shaft and including a surface which mates with the flexible fingers and rotation of the collar on the first shaft changes the portion of the fingers which are flexible, a series of spacers disposed between the collar and the first stop to act as a stop for the collar and which permit removal to form a variable stop for the collar, the second shaft has a plurality of cavities on opposite sides of the annular groove and aligned with the shaft fingers and the cavities are used to generate a noise in the event the shafts telescope, and a plurality of resilient discs disposed in the first shaft for cushioning the second shaft when the shafts telescope toward each other;

whereby the two shafts move as a unit until a predetermined force against the shafts forces the tapered teeth on the flexible fingers out of the annular groove and thereby permits the shafts to telescope relative to each other.

References Cited by the Examiner

UNITED STATES PATENTS

| | | | |
|---|---|---|---|
| 1,904,061 | 4/1933 | Larson | 251—89.5 |
| 2,541,356 | 2/1951 | Hansmann | 280—452 |
| 2,741,889 | 4/1956 | Elfes | 287—119 X |

LEO FRIAGLIA, *Primary Examiner.*

UNITED STATES PATENT OFFICE
CERTIFICATE OF CORRECTION

Patent No. 3,300,233                                January 24, 1967

David C. Olson

It is hereby certified that error appears in the above numbered patent requiring correction and that the said Letters Patent should read as corrected below.

Column 4, line 61, column 5, lines 3, 15 and 33, and column 6, lines 33, 52 and 70, before "shaft", each occurrence, strike out "second" and insert instead -- first --.

Signed and sealed this 15th day of April 1969.

(SEAL)
Attest:

Edward M. Fletcher, Jr.                          EDWARD J. BRENNER

Attesting Officer                                     Commissioner of Patents